United States Patent
Cho

(10) Patent No.: US 8,804,009 B2
(45) Date of Patent: Aug. 12, 2014

(54) MULTIMEDIA INFORMATION APPLIANCE

(75) Inventor: Hyunduk Cho, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 330 days.

(21) Appl. No.: 12/662,704

(22) Filed: Apr. 29, 2010

(65) Prior Publication Data

US 2010/0295969 A1    Nov. 25, 2010

(30) Foreign Application Priority Data

May 21, 2009    (KR) .................. 10-2009-0044591

(51) Int. Cl.
H04N 5/76    (2006.01)
H04N 5/228    (2006.01)

(52) U.S. Cl.
USPC .................... 348/231.9; 348/222.1

(58) Field of Classification Search
USPC ......... 348/231.99, 207.99, 231.1–231.9, 294, 348/222.1
See application file for complete search history.

(56) References Cited

U.S. PATENT DOCUMENTS

| | | | |
|---|---|---|---|
| 6,509,927 B1 * | 1/2003 | Prater et al. | 348/222.1 |
| 6,992,711 B2 * | 1/2006 | Kubo | 348/231.7 |
| 7,280,136 B2 * | 10/2007 | Kuroiwa | 348/231.99 |
| 2003/0020817 A1 * | 1/2003 | Kuroiwa | 348/231.99 |

FOREIGN PATENT DOCUMENTS

| | | |
|---|---|---|
| KR | 10-0581516 | 5/2006 |
| KR | 10-0676701 | 1/2007 |
| KR | 10-0715522 | 4/2007 |

* cited by examiner

*Primary Examiner* — Ahmed A Berhan
(74) *Attorney, Agent, or Firm* — Harness, Dickey & Pierce, P.L.C.

(57) ABSTRACT

A multimedia information appliance includes a camera unit, an image display unit, and a multi-port memory. The camera unit includes an image sensor, an image signal processor, an application processor, and a multi-port memory. The image sensor is configured to receive an optical signal of a photographed image from a lens, and to convert the optical signal into an electrical signal. The image signal processor is configured to convert the electrical signal into an image signal, and to control the image sensor. The application processor is configured to process the image signal. The multi-port memory includes a plurality of data input/output ports and stores signals received from the image signal processor and the application process through different data input/output ports.

10 Claims, 8 Drawing Sheets

MULTIMEDIA INFORMATION APPLIANCE

CROSS-REFERENCE TO RELATED APPLICATIONS

This U.S. non-provisional patent application claims priority under 35 U.S.C. §119 of Korean Patent Application No. 10-2009-0044591, filed on May 21, 2009, the entire contents of which are hereby incorporated by reference.

BACKGROUND

Example embodiments relate to a multimedia information appliance including a camera unit, an image display unit, and a multi-port memory, and particularly, to a multimedia information appliance including a camera unit, an image display unit, and a multi-port memory, which can reduce a total number of components of the multimedia information appliance and improve performance.

As the mobile communication terminals become increasingly multi-functional, secondary functions such as camera and multimedia playback, along with an improved wireless communication function are being added to mobile communication terminals. The application, features and functionality of the camera are increasingly expanding through improvements in display screen of a mobile communication terminal and high-speed communication. As a result, a number of mobile communication terminals equipped with cameras is steadily increasing, and the performance (e.g., number of pixel) of the camera modules mounted in the mobile communication modules are steadily improving.

Hereinafter, an internal configuration of a conventional camera unit including a camera module and an application processor in a multimedia terminal is described with reference to FIG. 1.

Referring to FIG. 1, a conventional camera unit 50 includes a lens 10, an image sensor 20 that senses optical signals of an image photographed by a camera and converts the optical signals into electrical signals and outputs the electrical signals, an Image Signal Processor (ISP) 30 that converts the electrical signals output from the image sensor 20 into image signals, and an application processor 40 that receives the image signals from the ISP 30 and processes the image signals.

The camera unit additionally includes a frame memory 31 that stores various parameters necessary to control data processed in the ISP 30 and the image sensor 20 and a frame memory 41 that stores data processed in the application processor 40. Accordingly, the conventional camera unit 10 and a multimedia information appliance including the camera unit 10 include two (or more) frame memories 31 and 41.

SUMMARY

According to an example embodiment of the inventive concepts, a camera unit includes an image sensor configured to receive an optical signal of a photographed image from a lens and configured to convert the received optical signal into an electrical signal; an image signal processor configured to convert the electrical signal into an image signal and configured to control the image sensor; an application processor configured to process the image signal; and a multi-port memory including a plurality of data input/output ports, the multi-port memory configured to receive the image signal from the image signal processor and the application processor using different data input/output ports of the plurality of data input/output ports.

According to an example embodiment of the inventive concepts, the multi-port memory includes a first port electrically connected to the image signal processor; a second port electrically connected to the application processor; a first port bank electrically connected to the first port and configured to store data; and a second port bank electrically connected to the second port and configured to store data.

According to an example embodiment of the inventive concepts, the multi-port memory further includes a third port connected to the application processor.

According to an example embodiment of the inventive concepts, the multi-port memory includes a first port configured to receive parameters that control data processed in the image signal processor and the image sensor from the image signal processor; a second port configured to receive data processed in the application processor; a first port bank storing the data control parameters received from the first port; and a second port bank receiving and storing the data processed in the application processor.

According to an example embodiment of the inventive concepts, the multi-port memory further includes a third port configured to receive data processed in the application processor.

According to an example embodiment of the inventive concepts, a multimedia information appliance includes an image sensor configured to receive an optical signal of a photographed image from a lens and configured to convert the received optical signal into an electrical signal; an image signal processor configured to convert the electrical signal into an image signal and configured to control the image sensor; an application processor configured to process the image signal; a multi-port memory including a plurality of data input/output ports, the multi-port memory configured to receive the image signal from the image signal processor and the application processor using different data input/output ports of the plurality of data input/output ports; and an image display unit configured to display an image on a screen based on the processed image signal and a control signal received from the application processor included in the camera unit.

According to an example embodiment of the inventive concepts, the image display unit includes a controller configured to control the processed image signal and the control signal received from the application processor; a driver configured to output a data signal and a gate signal in response to the processed image signal and the control signal received by the controller; and a display panel configured to display the image in response to the data signal and the gate signal.

According to an example embodiment of the inventive concepts, the controller receives the processed image signal from the multi-port memory.

According to an example embodiment of the inventive concepts, the multi-port memory includes a first port electrically connected to the image signal processor; a second port electrically connected to the application processor; a third port electrically connected to the controller; a first port bank electrically connected to the first port and configured to store data; a second port bank electrically connected to the second port and configured to store data; and a third port bank electrically connected to the third port and configured to store data.

According to an example embodiment of the inventive concepts, the multi-port memory further includes a fourth port connected to the application processor.

According to an example embodiment of the inventive concepts, the multi-port memory includes a first port configured to receive parameters that control data processed in the image signal processor and the image sensor from the image signal processor; a second port configured to receive data processed in the application processor; a third port configured to receive data supplied to the controller; a first port bank storing the data control parameters received from the first port; a second port bank receiving and storing the data processed in the application processor; and a third port bank receiving and storing the data supplied to the controller.

According to an example embodiment of the inventive concepts, the multi-port memory further includes a fourth port configured to receive data processed in the application processor.

According to an example embodiment of the inventive concepts, the controller and the driver are integrated into one chip, the chip receiving the processed image signal from the multi-port memory.

BRIEF DESCRIPTION OF THE DRAWINGS

The above and other features and advantages will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION OF EXAMPLE EMBODIMENTS

Figure 1:
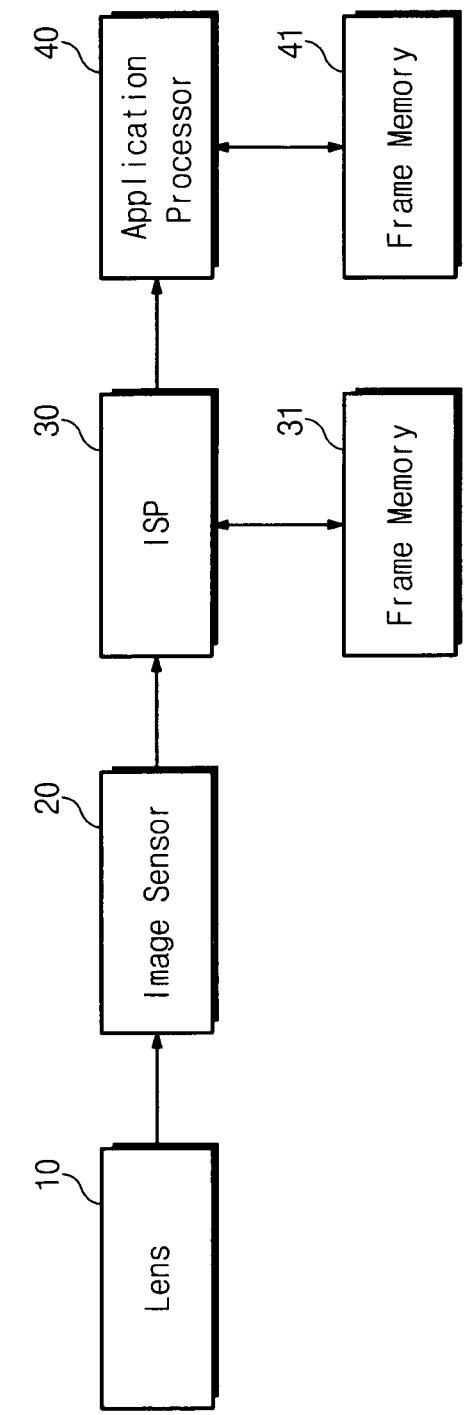
FIG. 1 is a block diagram illustrating a conventional camera module.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 2:
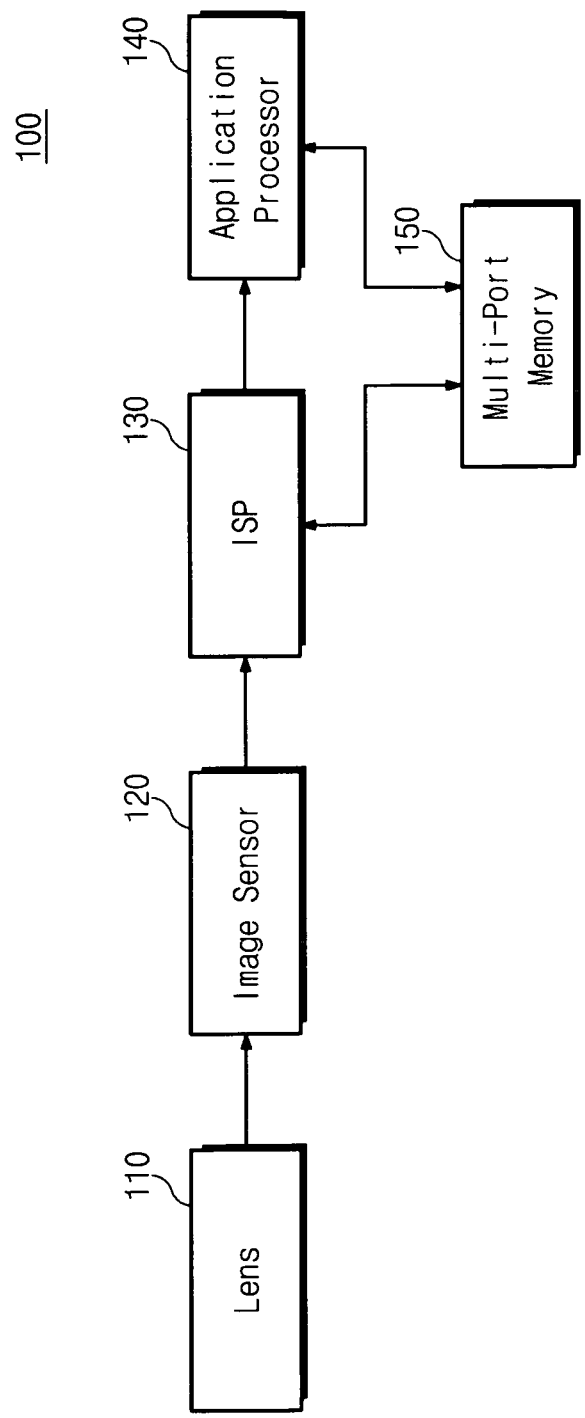
FIG. 2 is a block diagram illustrating a camera unit in a multimedia information appliance according to an example embodiment.
Figure 3:
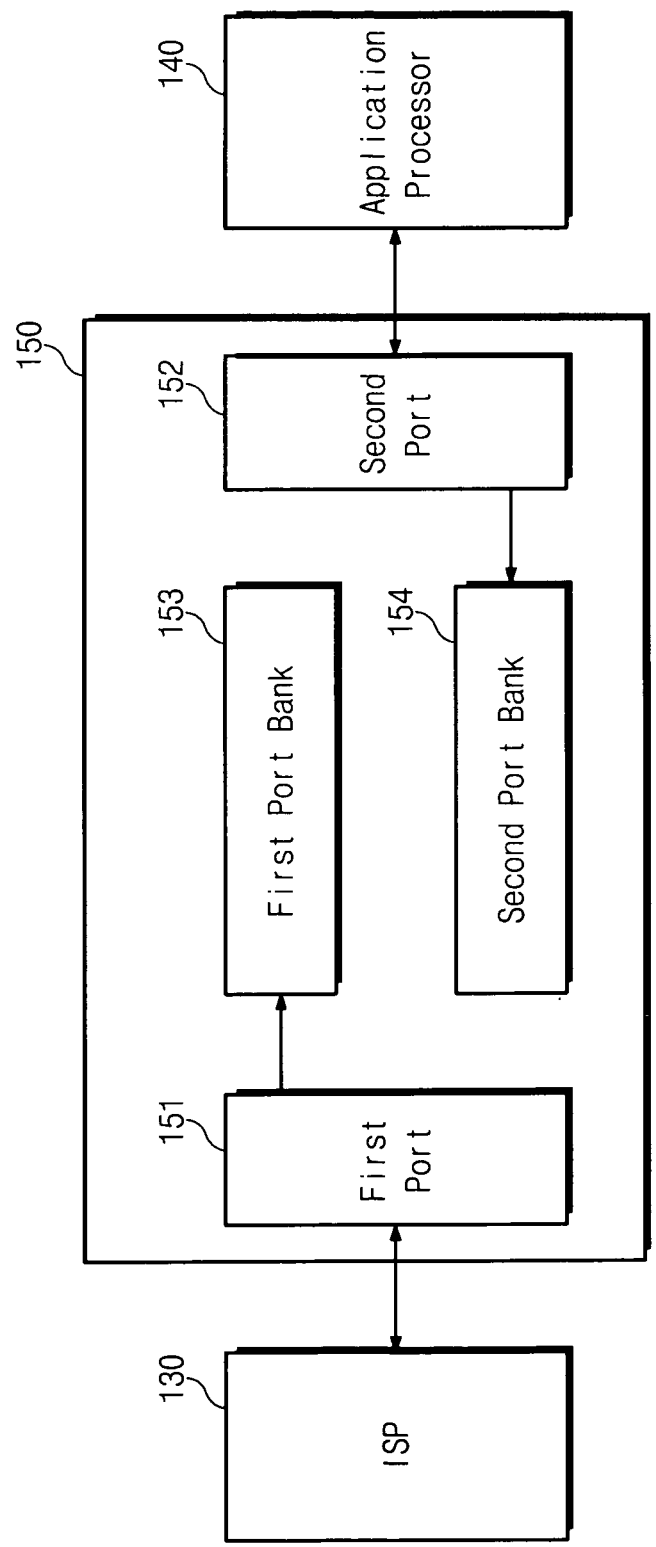
FIG. 3 is a block diagram illustrating a multi-port memory of FIG. 2.

FIG. 2 is a block diagram illustrating a camera unit included in a multimedia information appliance according to an example embodiment. FIG. 3 is a block diagram illustrating a multi-port memory of FIG. 2.

Referring to FIG. 2, a camera unit 100 may include a lens 110, an image sensor 120, an Image Signal Processor (ISP) 130, an application processor 140, and a multi-port memory 150.

The lens 110 may capture a subject. The image sensor 120 may sense a captured image and convert optical signals into electrical signals. The electrical signals generated in the image sensor 120 may be transmitted to the ISP 130.

The ISP 130 may convert the electrical signals output from the image sensor 120 into image signals. That is, the ISP 130 may digitize the electrical signals output from the image sensor 120, and may output the digitized image signals. Also, the ISP 130 may perform a function of controlling characteristics of the image sensor 120. Although not shown in FIG. 2, the image sensor 120 and the ISP 130 may be integrated into one chip.

The application processor 140 may compress and decompress the image signals supplied from the ISP 130, or may process the image signals for display. The multi-port memory 150 may be connected to the ISP 130 and the application processor 140, and may store signals received from the ISP 130 and signals received from the application processor 140.

Referring to FIG. 3, the multi-port memory 150 may include a first port 151 connected to the ISP 130, a second port 152 connected to the application processor 140, and a first port bank 153 connected to the first port 151, and a second port bank 154 connected to the second port 152.

The multi-port memory 150 may be connected to the ISP 130 and the application processor 140 through the first and second ports 151 and 152, respectively. That is, the ISP 130 and the application processor 140 may share the multi-port memory 150 through the independent first and second ports 151 and 152, respectively. The first port bank 153 may be accessed through the first port 151, and may read or write data. The first port bank 153 may store various parameters necessary to control data processed in the ISP 130 and the image sensor 120. The second port bank 154 may be accessed through the second port 152, and may read or write data. The second port bank 154 may store data processed in the application processor 140.

Since the ISP 130 and the application processor 140 share the multi-port memory 150 having two independent ports, the total number of memories provided in the camera module 100 can be reduced.

Figure 4:
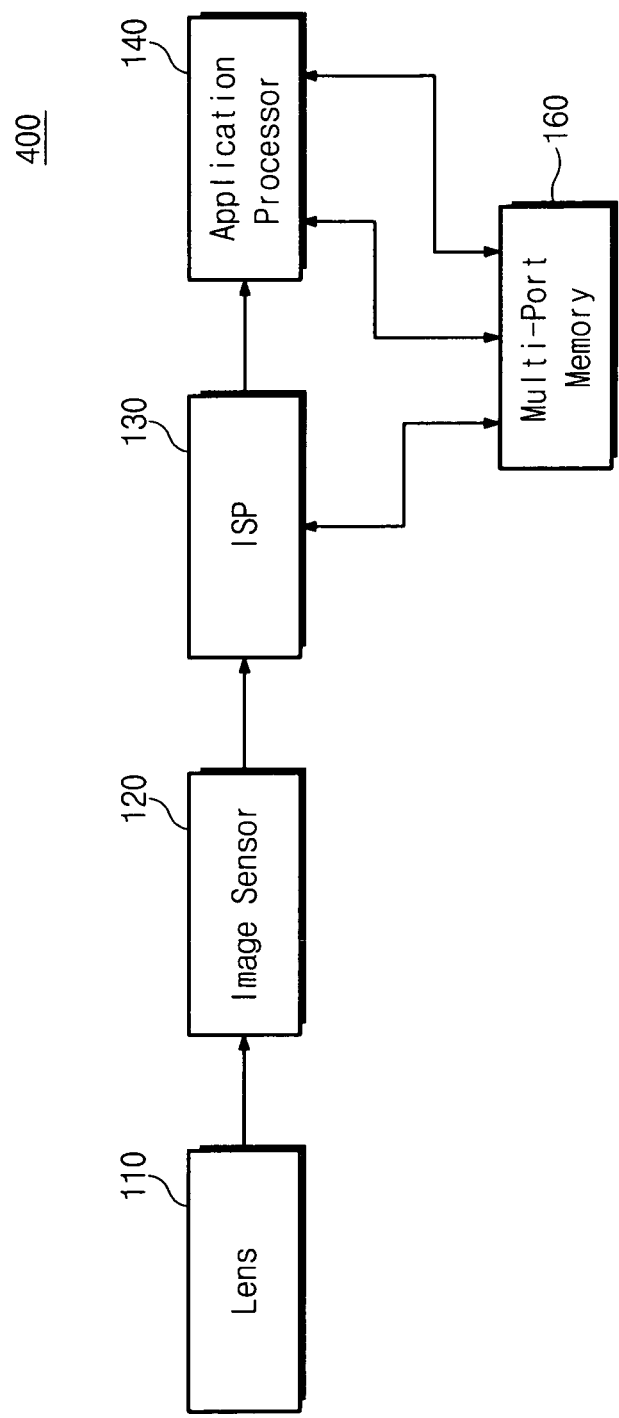
FIG. 4 is a block diagram illustrating a camera unit in a multimedia information appliance according to another example embodiment.

FIG. 4 is a block diagram illustrating a camera unit in a multimedia information appliance according to another example embodiment. Detailed description of components similar to those of FIG. 2 is omitted below for the sake of brevity.

Referring to FIG. 4, a camera unit 400 according to another example embodiment may include a multi-port memory 160 including three ports. One port of the multi-port memory 160 may be connected to the ISP 130, and two ports may be connected to the application processor 140. That is, high performance of multimedia information appliances may result in an increase in the amount of data that is processed in the application processor 140. Accordingly, the two ports may be allocated to the application processor 140 to improve the processing speed of the application processor 140.

Figure 5:
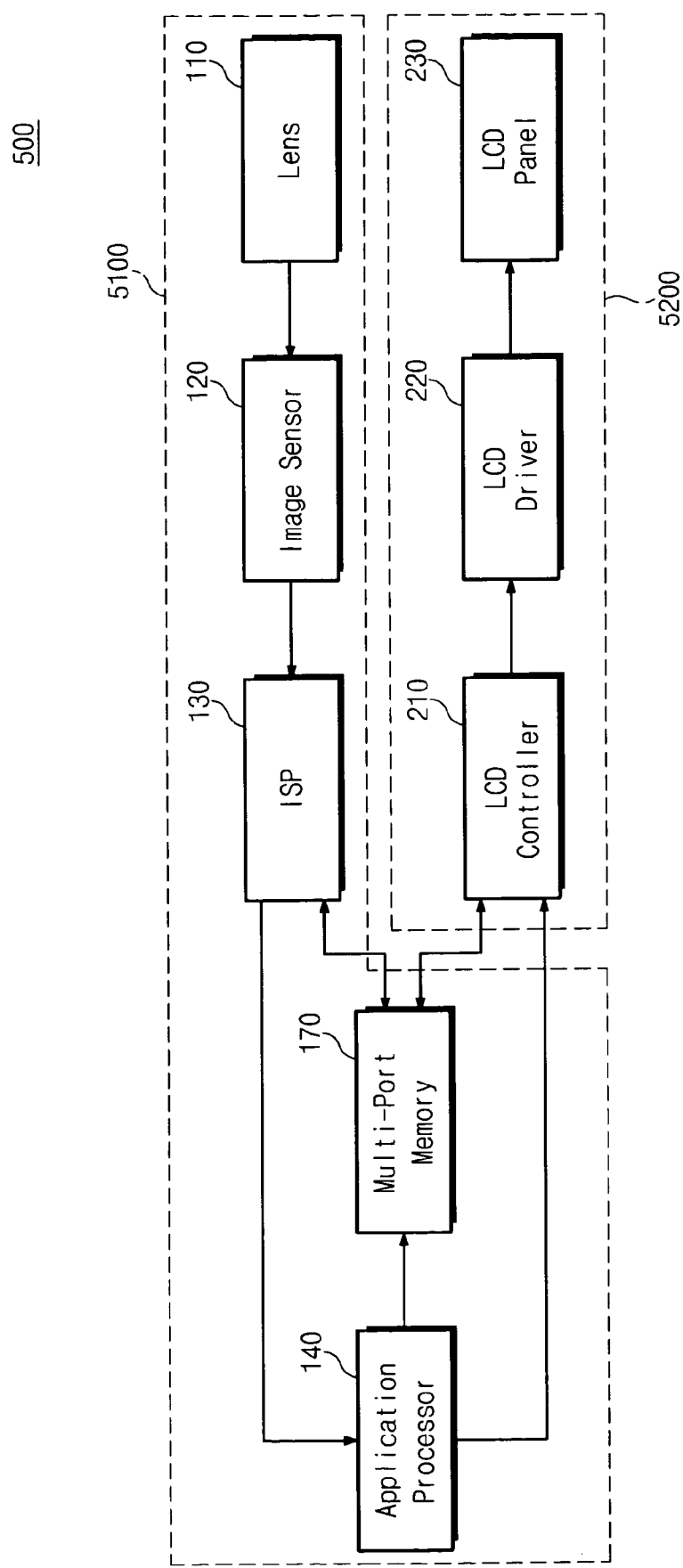
FIG. 5 is a block diagram illustrating a multimedia information appliance according to an example embodiment.
Figure 6:
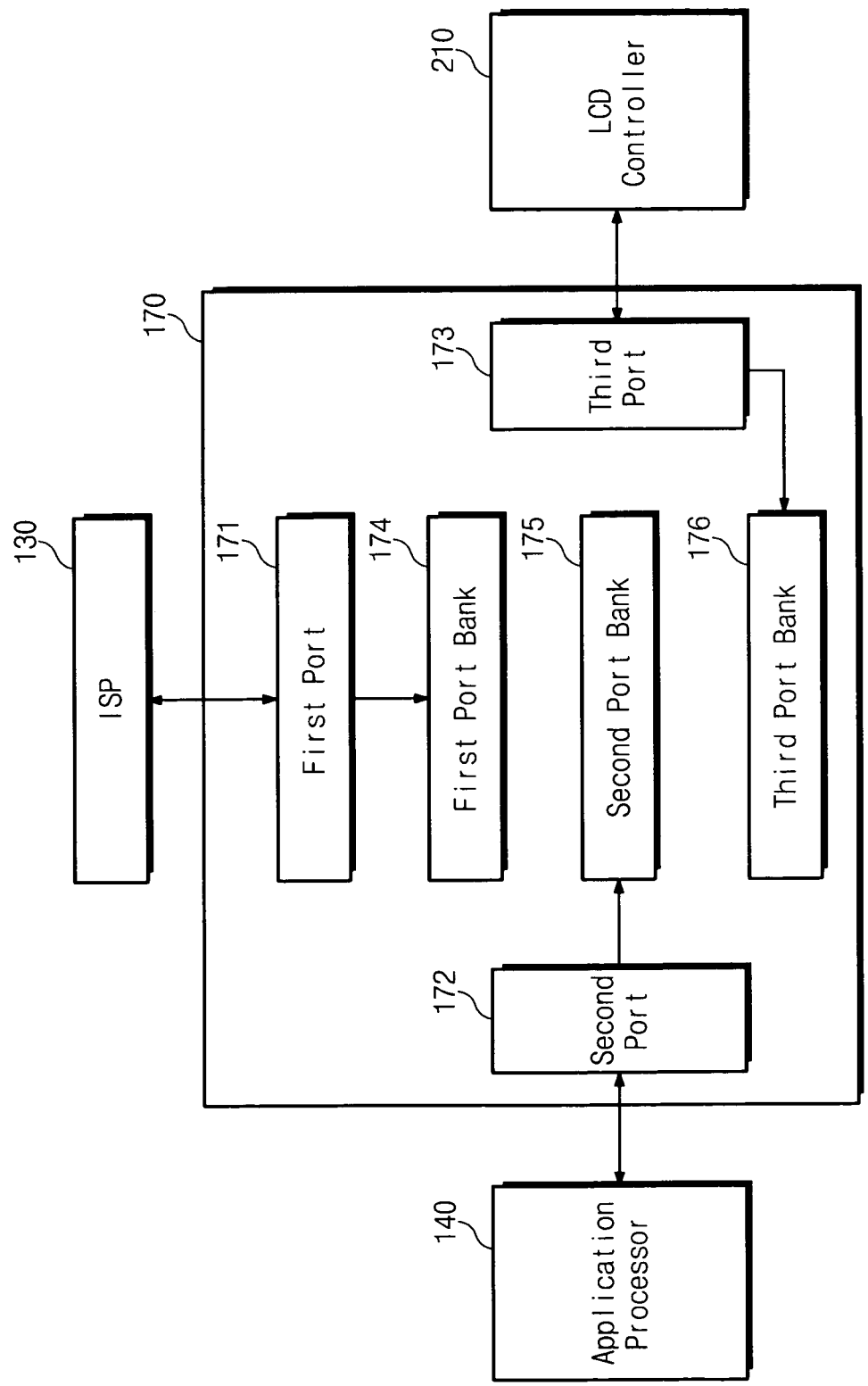
FIG. 6 is a block diagram illustrating a multi-port memory of FIG. 5.

FIG. 5 is a block diagram illustrating a multimedia information appliance according to an example embodiment. FIG. 6 is a block diagram illustrating a multi-port memory of FIG. 5 according to an example embodiment.

Referring to FIG. 5, a multimedia information appliance 500 according to an example embodiment may include a camera unit 5100 and an image display unit 5200. The configuration of the camera unit 5100 is somewhat similar to that described in FIG. 2, and thus detailed description thereof is omitted below for the sake of brevity.

The image display unit 5200 may include a LCD controller 210, a LCD driver 220, and a LCD panel 230. The LCD controller 210 may be connected to the application processor 140 of the camera unit 5100 to receive image signals, and may convert the data format of the received image signals in accordance with the interface specifications of the LCD driver 220. Also, the LCD controller 210 may output various control signals necessary for an operation of the LCD driver 220.

The LCD driver 220 may output data signals and gate signals necessary for the operation of the LCD panel 230 in response to the image signals and the various control signals supplied from the LCD controller 210. Accordingly, the LCD panel 230 may display images transmitted from the camera unit 100 in response to the data signals and the gate signals. Although not shown, the LCD driver 220 may include a gate driver outputting the gate signals and a data driver outputting the data signals.

According to an example embodiment of the inventive concepts, the LCD controller 210 may be connected to a multi-port memory 170 of the camera unit 5100 along with the ISP 130 and the application processor 140.

Referring to FIG. 6, the multi-port memory 170 may include a first port 171, a second port 172, a third port 173, a first port bank 174, a second port bank 175 and a third port bank 176.

The multi-port memory 170 may be connected to the ISP 130, the application processor 140, and the LCD controller 210 through the first port 171, the second port 172, and the third port 173, respectively.

Since the first port bank 174 is accessible through the first port 171, various parameters necessary to control data processed in the ISP 130 and the image sensor 120 may be stored in the first port-bank 174. Since the second port bank 175 is accessible through the second port 172, data processed in the application processor 140 may be stored in the second port bank 175. Since the third port bank 176 is accessible through the third port 173, data supplied to the LCD controller 210 may be stored in the third port bank 176.

Thus, since the ISP 130, the application processor 140, and the LCD controller 210 share the multi-port memory 170 having three independent ports 171, 172 and 173, the total number of memories provided in the multimedia information appliance 500 can be reduced.

Figure 7:
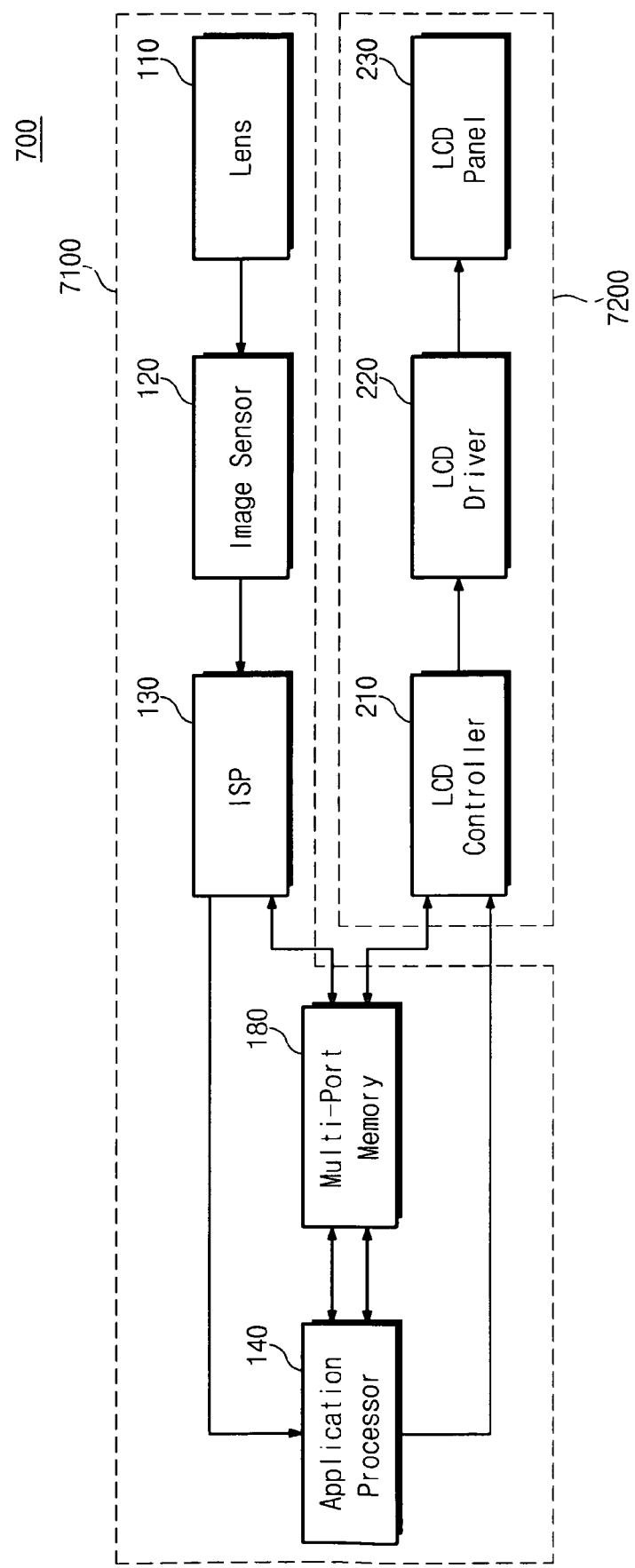
FIG. 7 is a block diagram illustrating a multimedia information appliance according to another example embodiment.

FIG. 7 is a block diagram illustrating a multimedia information appliance according to another example embodiment. Detailed description of components similar to those of FIG. 5 is omitted below for the sake of brevity.

Referring to FIG. 7, a multimedia information appliance 700 includes a camera unit 7100 and an image display unit 7200. The camera unit 7100 may include a multi-port memory 180 including four ports. One of the four ports of the multi-port memory 180 may be connected to the ISP 130, another port may be allocated to the LCD controller 210, and two ports may be allocated to the application processor 140. That is, high performance of the multimedia information appliance 700 may result in an increase in the amount of data that is processed in the application processor 140. Accordingly, two ports may be allocated to the application processor 140 to improve the processing speed of the application processor 140.

Figure 8:
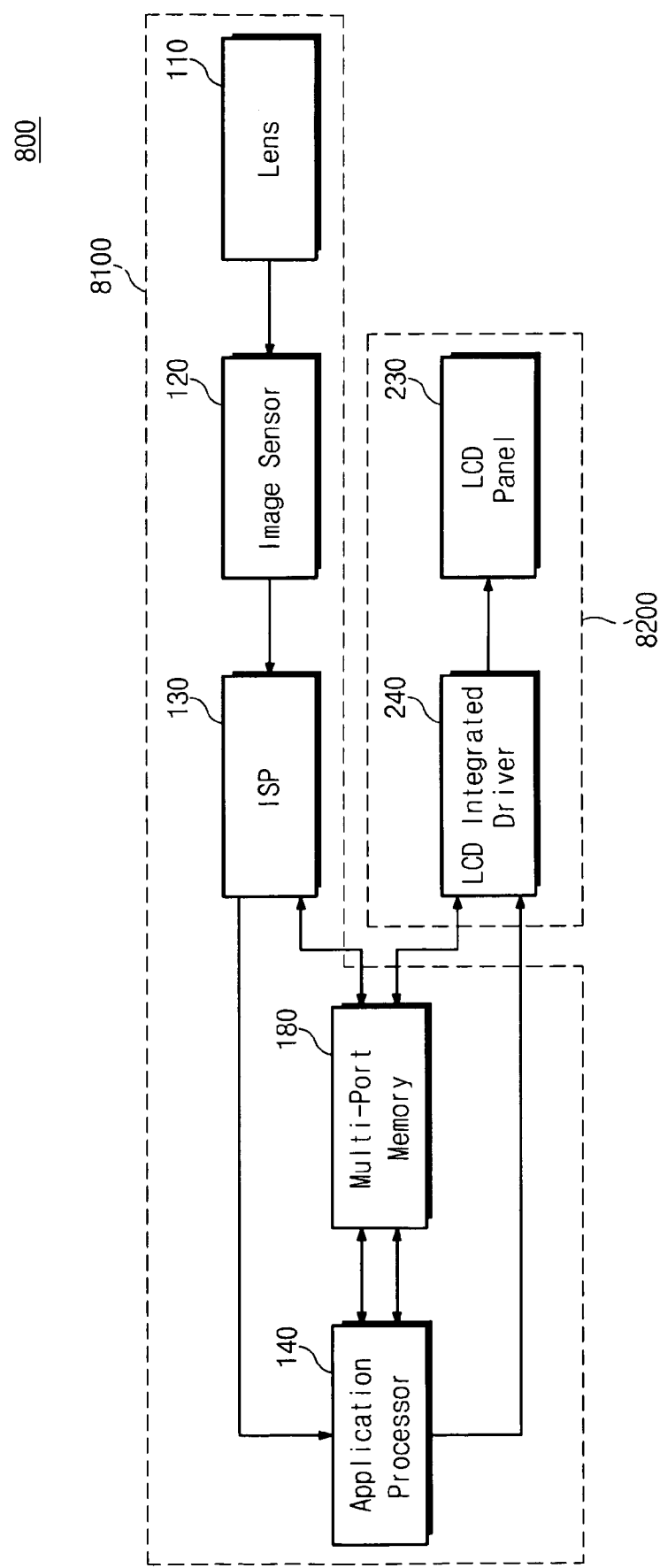
FIG. 8 is a block diagram illustrating a multimedia information appliance according to yet another example embodiment.

FIG. 8 is a block diagram illustrating a multimedia information appliance according to still another example embodiment. The configuration of a camera unit 8100 is somewhat similar to that described in FIG. 5, and thus detailed description thereof is omitted below for the sake of brevity Referring to FIG. 8, a multimedia information appliance 800 may include a camera unit 8100, somewhat similar to the camera unit 7100 of FIG. 7, and an image display unit 8200. The image display unit 8200 may include an LCD integrated driver 240 and an LCD panel 230.

The LCD controller 210 and the LCD driver 220 shown in FIG. 5 may be integrated into one chip to form the LCD integrated driver 240. Thus, when the LCD controller 210 and the LCD driver 220 are integrated into the one chip, the total number of chips provided in the image display unit 250 can be reduced.

According to an example embodiment of the inventive concepts, the LCD integrated driver 240 may share a multi-port memory 180 with an ISP 130 and an application processor 140. Specifically, the multi-port memory 180 may include four ports. One port may be connected to the ISP 130, two ports may be connected to the application processor 140, and one port may be connected to the LCD integrated driver 240.

Although above example embodiments are directed to multi-port memories 150, 160, 170 and 180 including two to four ports, the number of the ports in these multi-port memories is not limited thereto, and the multi-port memories may include an additional number of ports. Also, based on a number of ports of the multi-port memory, a number of ports allocated to the ISP 130, the LCD controller 210 and the application processor 140 may vary accordingly.

According to a multimedia information appliance including a camera unit, an image display unit, and a multi-port memory, the multi-port memory may be shared by the camera unit and the image display unit, thereby reducing a total number of the memories provided in the multimedia information appliance.

In addition, different ports can be allocated to respective processors, and if necessary, two or more ports can be allocated to the respective processors, thereby improving the operation speed.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A camera unit comprising:
   an image sensor configured to receive an optical signal of a photographed image from a lens and configured to convert the received optical signal into an electrical signal;
   an image signal processor configured to convert the electrical signal into an image signal and operable to control the image sensor;
   an application processor configured to process the image signal; and
   a multi-port memory including a plurality of data input/output ports, the multi-port memory configured to receive the image signal from the image signal processor and the application processor using different data input/output ports of the plurality of data input/output ports,
   wherein the multi-port memory includes,
   a first port configured to receive parameters that control data processed in the image signal processor and the image sensor from the image signal processor,
   a second port configured to receive data processed in the application processor,
   a first port bank configured to store the data control parameters received from the first port, and
   a second port bank configured to receive and store the data processed in the application processor.

2. The camera unit of claim 1, wherein the multi-port memory further comprises a third port connected to the application processor.

3. The camera unit of claim 1, wherein the multi-port memory further comprises a fourth port configured to receive data processed in the application processor.

4. A multimedia information appliance comprising:
   an image sensor configured to receive an optical signal of a photographed image from a lens and configured to convert the received optical signal into an electrical signal;
   an image signal processor configured to convert the electrical signal into an image signal and operable to control the image sensor;
   an application processor configured to process the image signal;
   a multi-port memory including a plurality of data input/output ports, the multi-port memory configured to receive the image signal from the image signal processor and the application processor using different data input/output ports of the plurality of data input/output ports; and
   an image display unit configured to display an image on a screen based on the processed image signal and a control signal received from the application processor included in the camera unit,
   wherein the multi-port memory includes,
   a first port configured to receive parameters that control data processed in the image signal processor and the image sensor from the image signal processor,
   a second port configured to receive data processed in the application processor,
   a third port configured to receive data supplied to a display controller,
   a first port bank configured to store the data control parameters received from the first port,
   a second port bank configured to receive and store the data processed in the application processor, and
   a third port bank configured to receive and store the data supplied to the display controller.

5. The multimedia information appliance of claim 4, wherein the image display unit comprises:
   a controller configured to control the processed image signal and the control signal received from the application processor;
   a driver configured to output a data signal and a gate signal in response to the processed image signal and the control signal received by the controller; and
   a display panel configured to display the image in response to the data signal and the gate signal.

6. The multimedia information appliance of claim 5, wherein the controller receives the processed image signal from the multi-port memory.

7. The multimedia information appliance of claim 6, wherein the multi-port memory comprises:
   the first port electrically connected to the image signal processor;
   the second port electrically connected to the application processor;
   the third port electrically connected to the controller;
   the first port bank electrically connected to the first port and configured to store data;
   the second port bank electrically connected to the second port and configured to store data; and
   the third port bank electrically connected to the third port and configured to store data.

8. The multimedia information appliance of claim 7, wherein the multi-port memory further comprises a fourth port connected to the application processor.

9. The multimedia information appliance of claim 4, wherein the multi-port memory further comprises a fourth port configured to receive data processed in the application processor.

10. The multimedia information appliance of claim 5, wherein the controller and the driver are integrated into one chip, the chip receiving the processed image signal from the multi-port memory.

* * * * *